UNITED STATES PATENT OFFICE.

CHARLES E. HITE, OF BURLINGTON, NEW JERSEY, ASSIGNOR OF ONE-HALF TO WALTER PINCUS, OF PHILADELPHIA, PENNSYLVANIA.

PROCESS FOR MAKING AND PRESERVING SULFUR AND ALKALI COMPOUNDS.

1,132,476.  Specification of Letters Patent.  Patented Mar. 16, 1915.

No Drawing.  Application filed September 19, 1914.  Serial No. 862,478.

*To all whom it may concern:*

Be it known that I, CHARLES E. HITE, a citizen of the United States, residing at Burlington, in the county of Burlington and State of New Jersey, have invented certain new and useful Improvements in Processes for Making and Preserving Sulfur and Alkali Compounds; and I do hereby declare the following to be a full, clear, and exact description of the invention, such as will enable others skilled in the art to which it appertains to make and use the same.

My invention relates to a process for the making and preservation of a compound for example, of sulfur and caustic soda or any other basic substance which yields on solution in water, hydroxyl ions and is capable of turning litmus blue.

In my patent, dated July 29, 1913, No. 1068769, re-issued September 1, 1914 as No. 13796, I have disclosed and claimed a soluble compound of sulfur and alkali prepared in a manner therein specified. I may procure the product in the shape of the dry crystals there referred to, or I may provide enough water to procure the product of the process in a plastic or semi-plastic condition, from which condition it can be completely dissolved more readily than from the dry condition. Whether I obtain this product in a day or in a plastic condition, I find that in the presence of air or oxygen said product is liable to change. This change is characteristic of the dry form in the presence of moist air and ordinary air of the seaboard States usually contains sufficient moisture to cause the change to occur quite rapidly. The effect of the change referred to is to render the compound difficultly soluble and inefficient to some extent, therefore, for use as an antiseptic, or insecticide.

I have discovered that if, after the reaction has proceeded to the stage where complete and easy solubility is obtained, the reaction be checked, by removing the compound from the influence of heat; other than atmospheric, and by preventing access of air to said compound, I may preserve indefinitely the compound in a state of arrested reaction and capable of easy solution in water at ordinary temperatures as well as retain its pristine efficiency. I may also have the soluble compound in a state of complete solution before I seal it. This is not, however economical. Access of moist air to the crystals may be prevented in any of the ordinary ways, as by sealing, by the continuous maintenance of dry conditions, by preservation in an atmosphere substantially free from oxygen, or in a plastic or liquid medium free from water. Air tight sealing is the most convenient. This not only keeps moisture from the crystalline form, but it keeps both air and moisture from both the crystalline and the plastic forms. Any ordinary containers, as vials, flasks, or casks, may be used and the sealing may be effected by any of the ordinary waxy or resinous sealing agents by luting, sealing off, soldering or any other means.

What I claim as new therefore and desire to protect by Letters Patent of the United States is:—

1. The process which consists in effecting a reaction between a mixture, in suitable combining proportions, of sulfur and an alkali, under the influence of heat, arresting the reaction when a compound is formed substantially completely soluble in water and maintaining the compound in such completely soluble condition by excluding from access to it, water and oxygen.

2. The process which consists in subjecting a mixture of sulfur and soda in substantially equal proportions to the effect of heat above the normal atmospheric temperature until a compound of soda and sulfur is formed, which is practically completely soluble in water, arresting the operation at this point and maintaining the compound so formed under such condition that access of moisture and air thereto is precluded.

3. The process which consists in subjecting a mixture of alkali and sulfur in suitable proportions to heat until a compound is formed soluble in water, removing it from the influence of heat at this point and sealing it whereby the continuance of reaction is arrested and whereby the chemical stability and soluble condition are maintained indefinitely.

4. The process which consists in mixing sulfur and a fixed alkali in suitable proportions, heating to produce reaction, continuing the heating until substantially the whole compound is soluble, then checking the reaction and keeping the compound from access of agents which will produce a second chemical reaction and thereby produce a difficultly soluble compound.

5. The process which consists in heating a suitable mixture of sulfur and alkali until a compound soluble in water is produced by reaction between the sulfur and alkali and, at this point, stopping the reaction and sealing to prevent further reaction by the effect of air and moisture.

6. The process which consists in mixing together and heating approximately combining proportions of sulfur and a fixed alkali and when the alkali has been substantially neutralized, preventing further reaction by maintaining the compound in a condition whereby access of air or moisture is prevented.

7. The process which consists in forming a mixture in the dry state, of combining proportions of sulfur and any basic substance which yields on solution in water, hydroxyl ions, and is able to turn litmus blue, subjecting the mixture to heat in order to start reaction, allowing the reaction to continue until a product is reached which is practically completely soluble, cooling, and sealing to prevent further action, or the secondary reaction which takes place upon exposure to oxygen and moisture.

8. The process which consists in forming a mixture in a dry state, of combining proportions of sulfur and any basic substance capable of reacting with sulfur in the presence of water with evolution of heat, and which substance yields on solution in water, hydroxyl ions, adding water, starting reaction, allowing reaction to continue until a product is obtained which is practically completely soluble in water, and sealing to prevent further reaction, or the secondary action which may take place upon exposure to oxygen and moisture.

In testimony whereof, I affix my signature, in presence of two witnesses.

CHARLES E. HITE.

Witnesses:
WALTER PINCUS,
MARY E. HAMER.